United States Patent
Chan et al.

(10) Patent No.: US 10,761,649 B2
(45) Date of Patent: Sep. 1, 2020

(54) TOUCH INPUT METHOD AND HANDHELD APPARATUS USING THE METHOD

(71) Applicant: PERFECT SHINY TECHNOLOGY (SHENZHEN) LIMITED, Shenzhen (CN)

(72) Inventors: Ming Kwong Chan, Hong Kong (CN); Shih-Hsien Hu, New Taipei (TW)

(73) Assignee: PERFECT SHINY TECHNOLOGY (SHENZHEN) LIMITED, Shenzhen (CN)

(*) Notice: Subject to any disclaimer, the term of this patent is extended or adjusted under 35 U.S.C. 154(b) by 3 days.

(21) Appl. No.: 16/287,082

(22) Filed: Feb. 27, 2019

(65) Prior Publication Data

US 2019/0265832 A1 Aug. 29, 2019

(30) Foreign Application Priority Data

Feb. 27, 2018 (CN) .......................... 2018 1 0162198
Dec. 19, 2018 (CN) .......................... 2018 1 1557963

(51) Int. Cl.
*G06F 3/041* (2006.01)
*H04M 1/02* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/041661* (2019.05); *H04M 1/0266* (2013.01); *G06F 3/0446* (2019.05); *G06F 2203/04107* (2013.01)

(58) Field of Classification Search
CPC .. G06F 3/0416; G06F 3/041661; G06F 3/044; G06F 3/043

USPC ................................................... 345/173, 174
See application file for complete search history.

(56) References Cited

U.S. PATENT DOCUMENTS

| 9,430,103 | B2 | 8/2016 | Hu |
| 9,791,949 | B2* | 10/2017 | Myers ................. G06F 3/04886 |
| 10,216,318 | B2* | 2/2019 | Moon ................. H04M 1/0245 |
| 2014/0035865 | A1 | 2/2014 | Hu |
| 2014/0083834 | A1 | 3/2014 | Chou et al. |

FOREIGN PATENT DOCUMENTS

| CN | 103677467 | 3/2014 |
| TW | I464644 | 12/2014 |

* cited by examiner

*Primary Examiner* — Calvin C Ma
(74) *Attorney, Agent, or Firm* — WPAT, PC

(57) ABSTRACT

A handheld apparatus with touch input function is provided. The handheld apparatus includes a casing and a cover collectively defining an accommodation space for accommodating a control circuit chip and a touch-sensitive module. The touch-sensitive module includes a first and a second touch sensor set. The second touch sensor set includes separate sensor pads arranged in a column, and each sensor pad is connected to the control circuit chip through a respective trace. In a first mode, at least one of the sensor pads senses a first capacitance change thereof in response to an object positioned near or on the sidewall. In a second mode, the sensor pads are connected in parallel to form at least one sensor electrode, which cooperates with the first touch sensor set to sense a second capacitance change thereof in response to the object positioned near or on the cover.

25 Claims, 15 Drawing Sheets

TOUCH INPUT METHOD AND HANDHELD APPARATUS USING THE METHOD

FIELD OF THE INVENTION

The present disclosure relates to touch control technology, and particularly to a touch input method and a handheld apparatus using the touch input method.

BACKGROUND OF THE INVENTION

Nowadays, smartphones with touch-screen interface have become the most popular personal mobile apparatuses. In a smartphone, a mobile operating system is used, and functions of the smartphone can be extended through installing various application programs. Furthermore, the essential functions of the smartphone such as network connection, identity authentication, multimedia presentation, digital camera and navigation make the smartphone to serve as a communication device based on a mobile node.

Please refer to FIG. 1, which is a schematic diagram illustrating a conventional smartphone. The main body 10 of the smartphone is held in one hand at its usual state as shown in FIG. 1. The display module 14 occupies the largest area of the main body 10. In addition to display function, touch input function is usually integrated to the display module 14 to provide a user interface of the smartphone.

Please refer to FIG. 2, which is a schematic diagram illustrating the interior of the conventional smartphone. The touch input function is provided by a touch-sensitive module 22 attached to a lower surface of the transparent cover 21. The touch-sensitive module 22 senses touch operations of finger(s) on an upper surface of the transparent cover 21. The touch-sensitive module 22 is bonded to the transparent cover 21 and the display module 23 by an optically clear adhesive (OCA) 24. The display module 23 may be a liquid crystal display (LCD), an organic light-emitting diode (OLED) display or other flat-panel display. Other circuit components 25 are disposed on a circuit board 26 located under the display module 23. The circuit board 26 is electrically connected to the display module 23 and the touch-sensitive module 22 through flexible printed circuit (FPC) boards 27.

The above-mentioned parts are disposed in a space defined by a lower casing 12 and the upper transparent cover 21. Related components and wires are disposed in the clearance between both sides 12S of the casing 12 and the display module 23. Therefore, light-shielding material is usually coated to hide the clearance. Further, proximity sensors 70 are disposed near both sides 12S of the casing 12 for specific sensing to enhance the user interface. However, the proximity sensors 70 additionally introduced near both sides 12S of the casing 12 need additional driver circuits, and increase complexity of the entire structure of the smartphone and production difficulty.

SUMMARY OF THE INVENTION

The present disclosure provides a touch input method and a handheld apparatus using the touch input method with better touch input performance and simpler structure.

An aspect of the present disclosure provides a handheld apparatus with touch input function. The handheld apparatus includes a casing and a cover. The cover is connected to a sidewall of the casing, and an accommodation space is defined by the cover and the casing. A control circuit chip disposed in the accommodation space operates in a first mode and a second mode. A touch-sensitive module disposed in the accommodation space and electrically connected to the control circuit chip includes a first touch sensor set and a second touch sensor set. The second touch sensor set includes separate sensor pads arranged in a column, and each separate sensor pad is connected to the control circuit chip through a respective trace. In the first mode, at least one of the separate sensor pads senses a first capacitance change thereof in response to an object in proximity of or in contact with the sidewall. In the second mode, the control circuit chip controls the separate sensor pads to be connected in parallel to form at least one sensor electrode, wherein the at least one sensor electrode cooperates with the first touch sensor set to sense a second capacitance change thereof in response to the object in proximity of or in contact with the cover.

Another aspect of the present disclosure provides a touch input method used with a handheld apparatus. The handheld apparatus includes a display module, an edge touch input module and a display touch input module. The touch input method includes steps of: sensing a phone-holding gesture by the edge touch input module; and deciding whether to enable the display touch input module according to the phone-holding gesture.

Another aspect of the present disclosure provides a touch input method used with a handheld apparatus. The handheld apparatus includes a display module, an edge touch input module and a display touch input module. The touch input method includes steps of: enabling the edge touch input module in a first mode to sense a phone-holding gesture to generate information of positions of contact points; and enabling the display touch input module in a second mode to sense a touch action and neglecting the contact points sensed in the first mode while sensing the touch action.

Another aspect of the present disclosure provides a handheld apparatus with touch input function. The handheld apparatus includes a casing and a transparent cover. The cover is connected to a sidewall of the casing, and an accommodation space is defined by the transparent cover and the casing. A touch-sensitive module disposed in the accommodation space includes a display touch sensor set and an edge touch sensor set close to the sidewall. In addition, a display module is disposed in the accommodation space and overlaps the display touch sensor set.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3A:
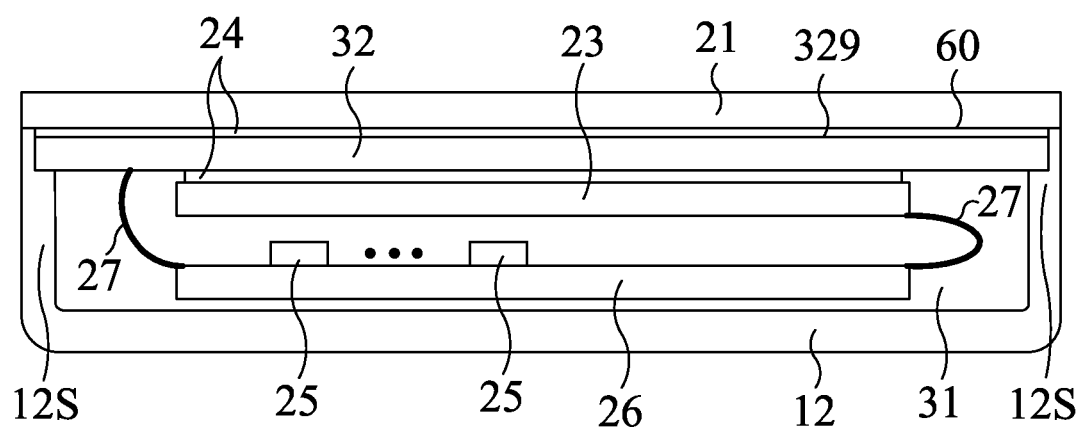
FIG. 3A is a schematic diagram illustrating the interior of a handheld apparatus with touch input function according to an embodiment of the present disclosure.
Figure 3B:
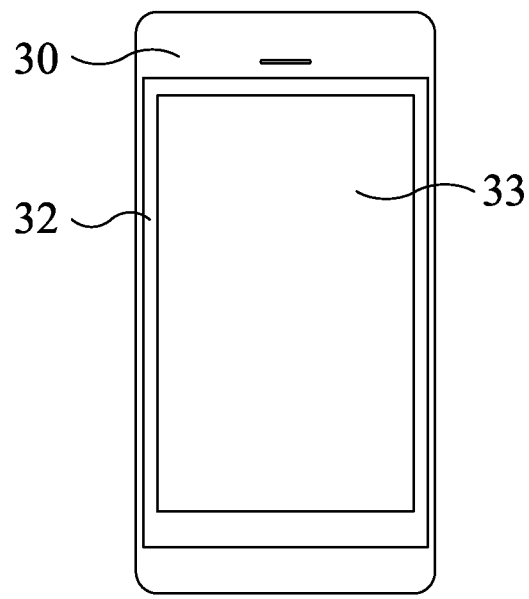
FIG. 3B is a top view illustrating the appearance of the handheld apparatus.

Pleaser refer to FIGS. 3A and 3B, which are schematic diagram illustrating the interior and the appearance of a handheld apparatus with touch input function according to an embodiment of the present disclosure. In the specification, a smartphone is taken as an example of the handheld apparatus for illustration purposes, but the present disclosure does not limit the type of the handheld apparatus. The casing 12 includes sidewalls 12S, and the transparent cover 21 (made of glass, for example) is connected and secured to ends of the sidewalls 12S of the casing 12 as shown in FIG. 3A. An accommodation space 31 is covered and defined by the transparent cover 21 and the casing 12. The accommodation space 31 is provided for accommodating a touch-sensitive module 32, a display module 23 and other circuit components. The touch-sensitive module 32 is bonded and attached to the transparent cover 21 by an optically clear adhesive (OCA) 24 connected to an upper surface 329 of the touch-sensitive module 32 and a lower surface 60 of the transparent cover 21. In this diagram, it is shown that the upper surface 329 of the touch-sensitive module 32 extends to both sides (e.g. left longer side and right longer side in the portrait direction) of the casing 12, and the edges of the touch-sensitive module 32 may touch the sidewalls 12S of the casing 12, and may even extend beyond the innermost surfaces of the sidewalls 12S. The touch-sensitive module 32 covers the entire surface of the display module 23, and the width of the touch-sensitive module 32 may excess the width of the display module 23. Such arrangement of the touch-sensitive module 32 can sense touch actions on the upper surface of the transparent cover 21 (called top touch action or top touch input hereinafter) and outer surfaces of the sidewalls 12S (called lateral touch action or lateral touch input hereinafter). It is to be noted that the term "touch action" in the present disclosure may cover the floating touch action in certain conditions. Other circuit components 25 are disposed on a circuit board 26 located under the display module 23. The circuit board 26 is electrically connected to the display module 23 and the touch-sensitive module 32 through flexible printed circuit (FPC) boards 27 or any known communication means.

The top view in FIG. 3B shows size and position relations between the visible region 33 of the display module 23 and the touch-sensitive module 32. In the embodiment, the width of the touch-sensitive module 32 is almost or approximately equal to the width of the main body 30 of the smartphone. Therefore, edge sensor pads are provided on the touch-sensitive module 32 beyond the visible region 33, or further extend to on at least one lateral surface of the main body 30. In another embodiment, the visible region 33 may cover the entire top surface of the main body 30, and may even partially or entirely cover the lateral surface of the main body 30, so as to provide a narrow-frame smartphone or a full screen display smartphone.

Figure 3C:
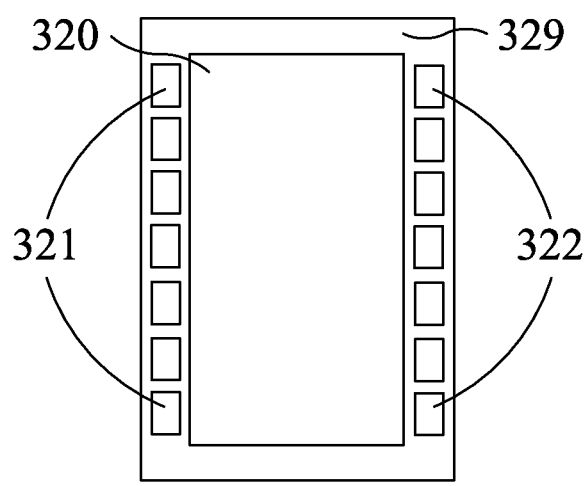
FIG. 3C is a top view illustrating the arrangement of the sensor pads of the handheld apparatus.

Please refer to FIG. 3C, which is a top view illustrating the arrangement of the sensor pads of the touch-sensitive module 32 of the handheld apparatus. The sensor pads disposed on the upper surface 329 of the touch-sensitive module 32 include two parts. One part is a display touch sensor set (display touch input module) 320 corresponding to the visible region 33 (respective sensor pads are not shown), and the other part includes at least one of a first edge touch sensor set (edge touch input module) 321 and a second edge touch sensor set 322. The top touch sensor set 320 is provided for mainly sensing the touch actions and/or user gestures within the visible region 33 (called display touch action or display touch input hereinafter), so that the display touch sensor set 320 is disposed on the display module 23 in the accommodation space 31 and overlaps with the display module 23 (visible region 33). The edge touch sensor sets 321 and 322 are close to or immediately adjacent to the sidewalls 12S for sensing the touch actions at the edge of the handheld apparatus (called edge touch action or edge touch input hereinafter). If the handheld apparatus is a narrow-frame smartphone or a full screen display smartphone, the display touch action may represent the top touch action except for the edge touch action).

Figure 3D:
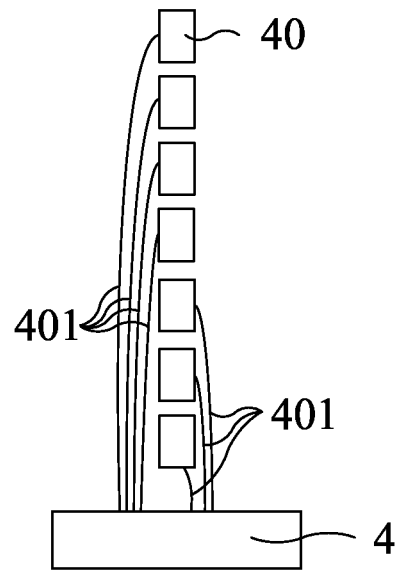
FIG. 3D is a top view illustrating the arrangement of the edge sensor set and traces of the handheld apparatus.

FIG. 3D shows that the first edge sensor set 321 includes a plurality of separate sensor pads 40 which are independent of each other. In this diagram, the first edge sensor set 321 includes seven sensor pads arranged in one column, but the present disclosure does not limit the number of the sensor pads. Each sensor pad 40 is electrically connected to a control circuit chip 4 through a respective trace 401 in one-to-one manner. The single-layer capacitive-sensitive technology has been described in CN 103677467 (family member US 2014/0083834) and TW 1464644 (family member US 2014/0035865), and contents of which are incorporated herein for reference. The control circuit chip 4 may be disposed in the touch-sensitive module 32, on the flexible printed circuit boards 27 or the circuit board 25. The control circuit chip 4 may further drive the display touch sensor set 320 and the second edge touch sensor set 322 to integrate all capacitive-sensing function and simplify production process.

Figure 3E:
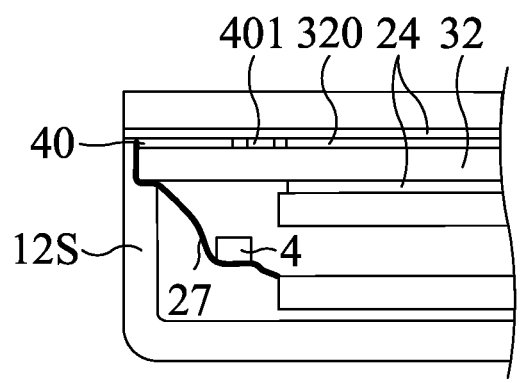
FIG. 3E is a schematic diagram illustrating an example of the interior structure at the edge of the handheld apparatus.

Please refer to FIG. 3E, which is a schematic diagram illustrating an example of the interior structure at the edge of the handheld apparatus. In the diagram, the sensor pads 40 are disposed on the upper surface of the touch-sensitive module 32 or an interlayer of the touch-sensitive module 32. Since the sensor pads 40 are very close to or connected to the sidewalls 12S, the sensor pads 40 and the control circuit chip 4 which constitute a sensor circuit can sense and detect the position of the user finger near or on the sidewall 12S. The sensor circuit can support both edge touch input and lateral touch input. For example, when the finger touches the outer surface of the sidewall 12S, a portion of the finger also touches the edge of the transparent cover 21 due to the phone-holding gesture. Hence, the smartphone supports lateral touch input.

Figure 3F:
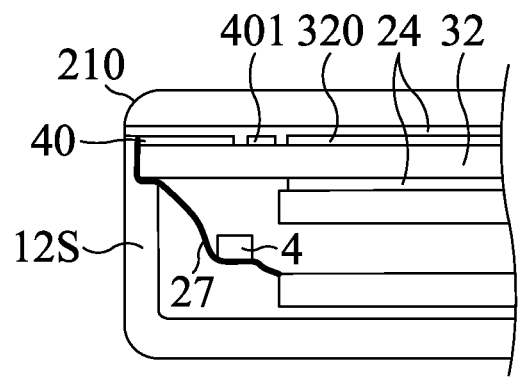
FIG. 3F is a schematic diagram illustrating another example of the interior structure at the edge of the handheld apparatus.

FIG. 3F shows another example of the interior structure at the edge of the handheld apparatus. In this diagram, the edge 210 of the transparent cover 21 is rounded. Thus, the sensor pads 40 and the control circuit chip 4 which constitute the sensor circuit can sense and detect the position of the user finger on the rounded edge 210 of the transparent cover 21 or on the sidewall 12S.

Figure 3G:
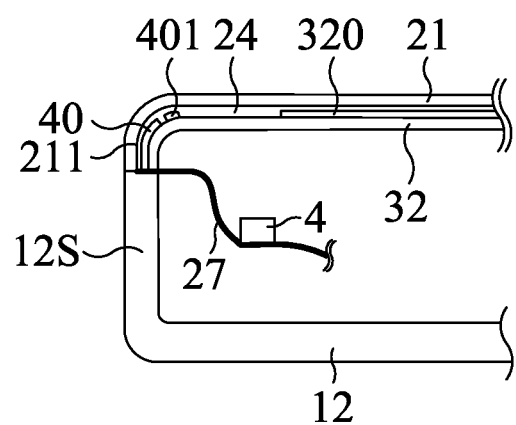
FIG. 3G is a schematic diagram illustrating a further example of the interior structure at the edge of the handheld apparatus.

FIG. 3G shows a further example of the interior structure at the edge of the handheld apparatus. The edge of the transparent cover 21 is bent to provide a curved edge 211, and the curved edge 211 is connected and secured to an end of the sidewall 12S as shown in FIG. 3G The main body of the touch-sensitive module 32 supporting the sensor pads 40 and the traces 401 may be made of a flexible board. When the flexible touch-sensitive module 32 is attached to the transparent cover 21, the edge of the touch-sensitive module 32 is conformal to the curved edge 211 of the transparent cover 21 so that the edge sensor pads 40 extend along the curved surface. Thus, the sensor pads 40 and the control circuit chip 4 which constitute the sensor circuit can sense and detect the position of the user finger on the curved edge of the transparent cover 21 or on the lateral surface of the smartphone.

Figure 1:
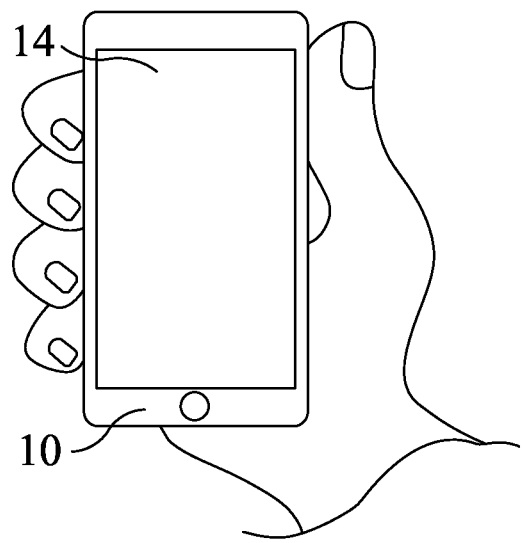
FIG. 1 is a top view of a conventional smartphone.
Figure 2:
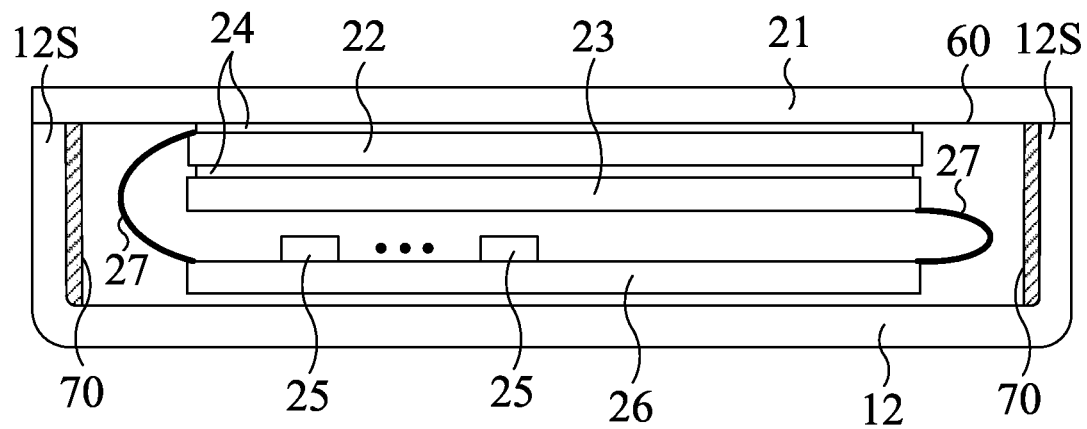
FIG. 2 is a schematic diagram illustrating the interior of the conventional smartphone.

The arrangement of the sensor pads in the above embodiments can provide lateral touch input function, or can further receive edge or lateral press actions. For example, when the user holds the smartphone in one hand as shown in FIG. 1, the edge touch sensor set can sense the distribution of the contact points and the capacitance change resulting from the contact between the fingers and the main body of the smartphone. When the user holds the smartphone more tightly, the contact area (of several contact points) between the fingers and the main body including the sidewalls 12S and the edges of the transparent cover 21 increases. Therefore, capacitance change occurs on more sensor pads and can be sensed by the edge touch sensor set. Under this condition, it is determined that the user is holding the smartphone tightly, and the following operation (e.g. taking a selfie) may be predicted and corresponding function or user interface is automatically provided and shown.

Figure 4A:
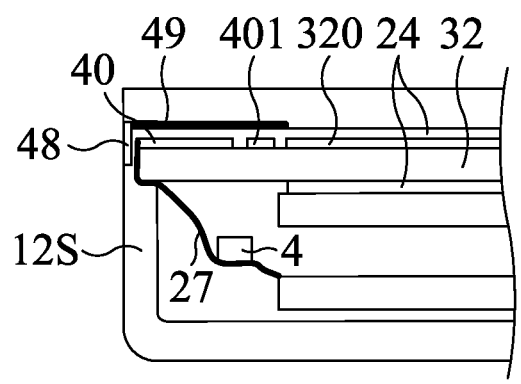
FIG. 4A is a schematic diagram illustrating an example of the interior structure at the edge of the handheld apparatus having a virtual lateral button.

Pleaser refer to FIG. 4A, which is a schematic diagram illustrating an example of the interior structure at the edge of the handheld apparatus having a virtual lateral button. A deformable part or a moving part 48 (e.g. a resilient member with or without a cap for simulating a real button) is disposed on the sidewall 12S. The deformable part or the moving part 48 deforms or shifts toward one sensor pad 40 in response to a press action. Thus, the user finer is closer to the sensor pad 40 at the opposite side of the sidewall 12S so that greater coupling capacitance of the sensor pad 40 is sensed and the control circuit chip 4 can determine that the user presses the virtual lateral button (the deformable part or the moving part) 48. The position of the virtual lateral button 48 may correspond to the position of the sensor pad 40. In other words, the edge of the sensor pad 40 points to the virtual lateral button 48.

Figure 4B:
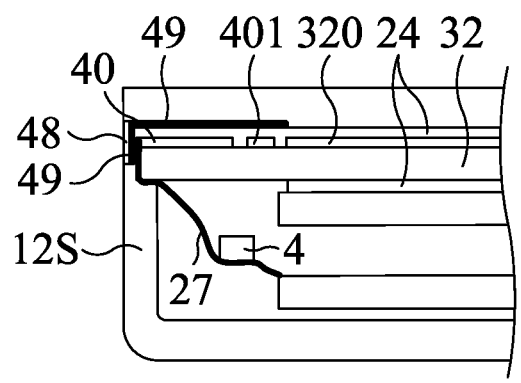
FIG. 4B is a schematic diagram illustrating another example of the interior structure at the edge of the handheld apparatus having the virtual lateral button.

The structure of FIG. 4A is modified by extending the ground electrode 49 to from the structure of FIG. 4B. The extended portion of the ground electrode 49 is formed inside the ground electrode 49 or attached to the virtual lateral button 48 and interposed between the virtual lateral button 48 and the neighboring edge touch sensor 40 (edge touch sensor set 321 or 322). The ground electrode 49 can shield the edge touch sensor from interference of unintentional touch near the edge of the smartphone, at which only the lateral press action is sensible. While pressing the virtual lateral button 48, the capacitance between the ground electrode 49 and the neighboring sensor pad 40 changes because the distance between them decreases. Hence, the lateral press action relative to the virtual lateral button 48 is sensible.

Figure 4C:
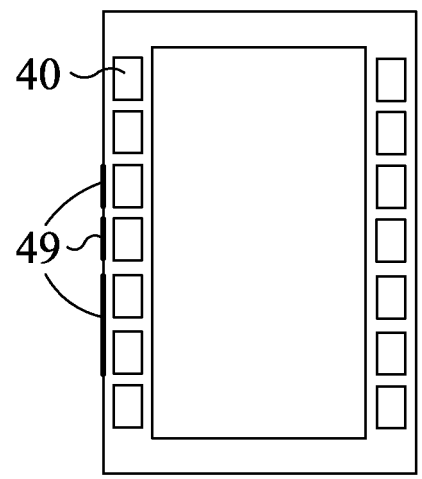
FIG. 4C is a top view illustrating the arrangement of the edge sensor pads and the ground electrodes in the handheld apparatus.

The arrangement of the sensor pads 40 and the ground electrodes 49 attached to the virtual lateral buttons 48 is shown in FIG. 4C. Such design can sense both lateral touch actions and lateral press actions. If the ground electrodes 49 are connected to a fixed voltage source (e.g. 0V or 5V), they shield the edge sensor pads 40 from sensing the finger approaching or touching the virtual lateral buttons 48, but the edge sensor pads 40 can sense the lateral press actions relative to the virtual lateral buttons 48 which deforms or shifts to change the capacitance between the ground electrodes 49 and the edge sensor pads 40. If the ground electrodes 49 are floating, the finger combined with the ground electrodes 49 provides greater coupling capacitance for the edge sensor pads 40. Therefore, the floating ground electrodes 49 should be aligned with the edge sensor pads 40 as shown in FIG. 4C to enhance the sensing of the lateral touch actions. By taking advantages of both conditions, the edge sensor pads 40 can sense the touch actions and the press actions by controlling the ground electrodes 49 to be grounded and floating, respectively, in a time-sharing manner.

Figure 4D:
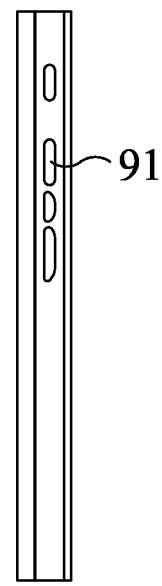
FIG. 4D is a side view illustrating the lateral buttons on the handheld apparatus.

Furthermore, the touch input method of the present disclosure may be applied to real buttons 91 on the lateral surface of the smartphone as shown in FIG. 4D. The real buttons may help user to correctly position the finger on the places corresponding to the edge sensor pads 40. For example, if the real button 91 is a volume button, pressing the volume button indicates volume up/down and sliding along the volume button corresponds to other operation, e.g. fine-tuning of the volume, bass/treble adjustment or screen brightness adjustment.

As described above, the edge touch sensor set(s) can detect the distribution of the contact points, the touch actions (e.g. sliding) and the press actions of one finger or more fingers on the lateral surface(s) of the smartphone. Such property can be used for achieving the following functions.

Figure 5:
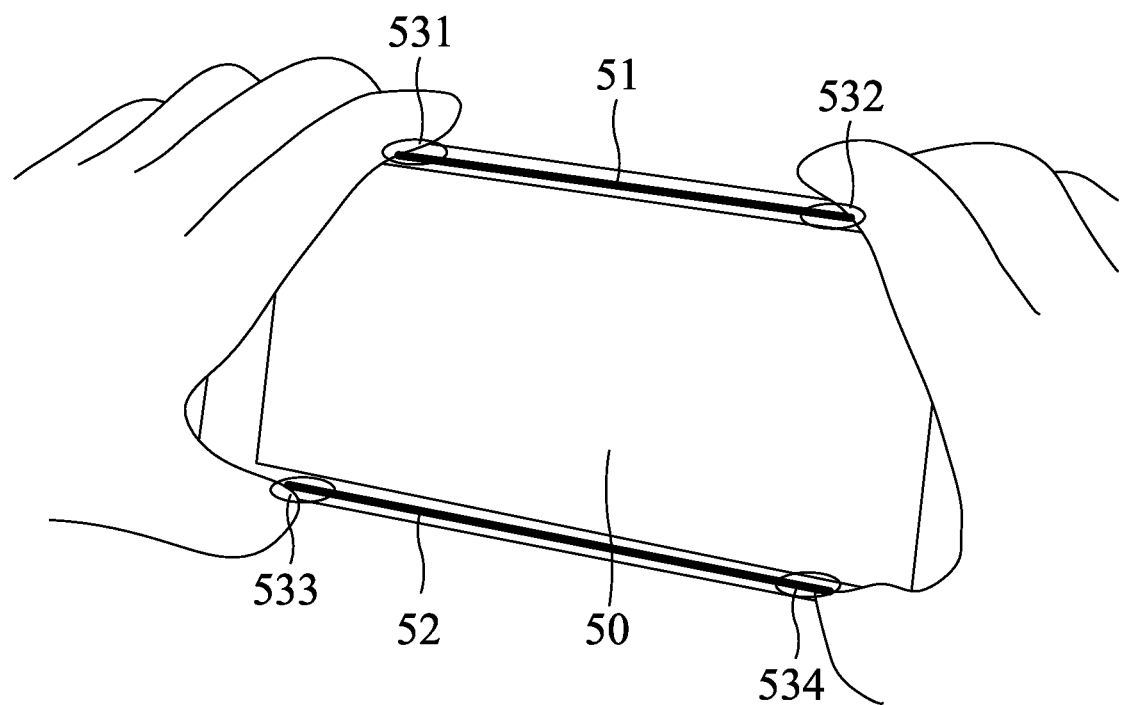
FIG. 5 is a schematic diagram illustrating the handheld apparatus and the gesture related to the function of digital camera.

Firstly, operation of the smartphone camera is described. When the user holds the smartphone 50 in two hands as shown in FIG. 5, the first edge touch sensor set 51 and the second edge touch sensor set 52 senses at least four contact points 531, 532, 533 and 534 at specific positions. Then, the smartphone 50 determines that the user wants to take a photo, and automatically executes the application program of the digital camera and shows related user interface or asks confirmation before showing the related user interface. The position of the contact region 532 or 534 corresponding to the right index finger or thumb is set as the shutter button, and the user can directly take a photo without selecting and tapping the application program of the digital camera and then tapping the shutter key defined on the transparent cover wherein these are not stable gestures compared with the tow-handed phone-holding gesture. When the user wants to take a selfie and holds the smartphone 50 in one hand (e.g. right hand), the first edge touch sensor set 51 and the second edge touch sensor set 52 senses at least two contact points 532 and 534 at specific positions. Then, the smartphone 50 determines that the user wants to take a selfie, and automatically executes the application program of the digital camera and shows selfie-related user interface or asks confirmation before showing the selfie-related user interface. The position of the contact region 532 or 534 corresponding to the right index finger or thumb is set as the shutter button, and the user can directly take a selfie by double tapping the shutter button or squeezing the smartphone 50 without selecting and tapping the application program of the digital camera and then tapping the shutter key defined on the transparent cover wherein this is a relatively unstable gesture to stretch one's thumb to touch the conventional shutter button at the middle of the screen. The squeezing action can be determined according to the change in the distribution of the contact points (e.g. more close contact points are detected when the hand holds the smartphone 50 in a tighter manner). Since the orientation of the smartphone 50 may be changed during different operations, a built-in accelerometer can provide the orientation information to the smartphone 50 to make sure the relative position of the right index finger or thumb.

Secondly, the phone-holding gesture can be sensed as follows. At first, the first edge touch sensor set 51 and the second edge touch sensor set 52 sense the contact points corresponding to the fingers for a period of time to get time-dependent information about the quantity and positions of the contact points. Then, the dominant hand can be determined according to the information. The sensing result can be provided for the above-mentioned application program of the digital camera to determine the position of the shutter button at the edge of the smartphone more properly.

Thirdly, the ability of sensing the finger sliding along the edge of the smartphone can enhance the operation of the smartphone. The sliding action sensed by the first edge touch sensor set 51 and the second edge touch sensor set 52 can be transformed into different control signals for different applications scenarios. For example, when the user uses a web browser on the smartphone to visit a web page, the user can slide the thumb along the edge of the smartphone with other four fingers holding the smartphone to scroll up/down the web page. Using a finger of the other hand to slide along the other edge of the smartphone may represent zoom in/out, volume up/down or screen brightness adjustment. Therefore, the virtual lateral buttons 48 may replace the conventional real buttons, e.g. volume button. In another case, in addition to the press actions, the real buttons may be designed to further support touch actions.

Figure 6:
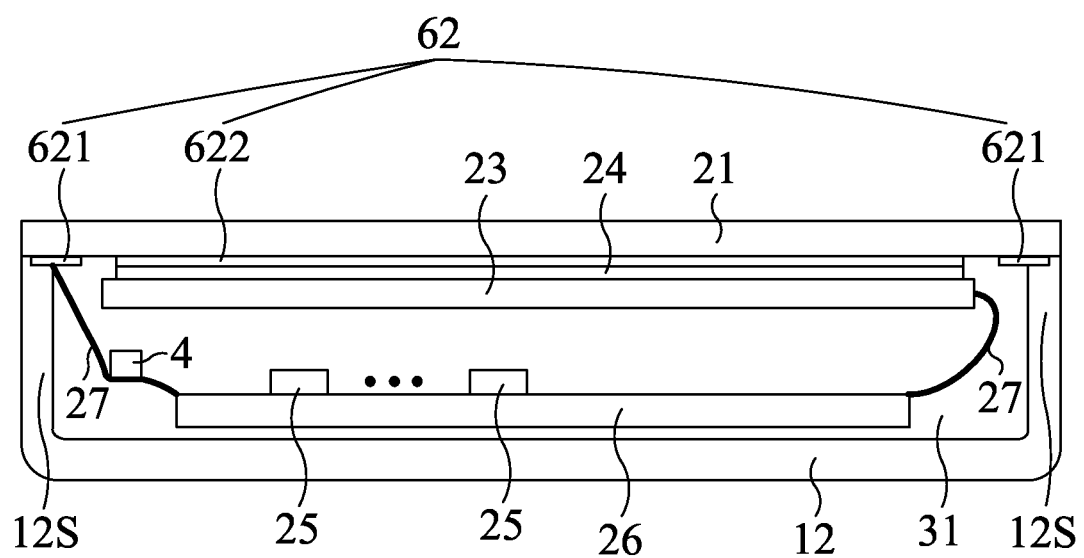
FIG. 6 is a schematic diagram illustrating the interior of a handheld apparatus with touch input function according to another embodiment of the present disclosure.

Please refer to FIG. 6, which is a schematic diagram illustrating the interior of a handheld apparatus with touch input function according to another embodiment of the present disclosure. Compared with the handheld apparatus of FIGS. 3A-3G, the touch-sensitive module 62 is made of transparent conducting material (e.g. indium tin oxide (ITO) or silver paste) and bonded to the lower surface of the transparent cover 21 directly. The touch-sensitive module 62 includes the display touch sensor set 622 and the edge touch sensor sets 621, and the later are close to or immediately adjacent to the sidewalls 12S. Then, the display module 23 is attached to the transparent cover 21 at the side of the touch-sensitive module 62 by the optically clear adhesive 24. In this diagram, the edge touch sensor sets 621 extend toward or into the sidewalls 12S, and the edges of the edge touch sensor sets 621 are as close to the outer surfaces of the sidewalls 12S of the casing 12 as possible so that the edge touch sensor sets 621 can sense the edge touch actions and the lateral touch actions. The other circuit components 25 are disposed on the circuit board 26 located under the display module 23. The circuit board 26 is electrically connected to the display module 23 and the touch-sensitive module 62 through the flexible printed circuit boards 27 or any known communication means. The control circuit chip 4 is disposed on one flexible printed circuit board 27.

Figure 7:
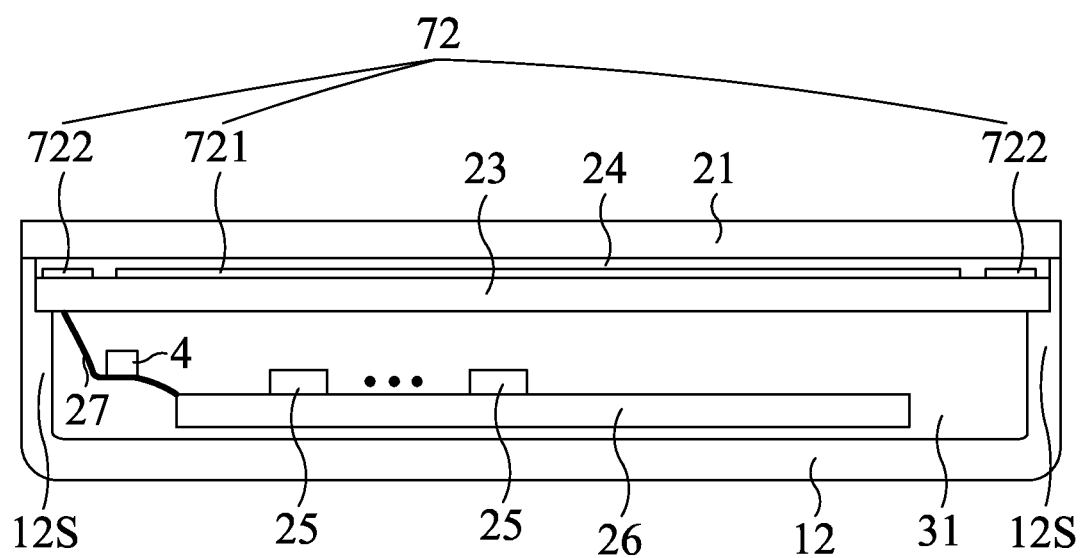
FIG. 7 is a schematic diagram illustrating the interior of a handheld apparatus with touch input function according to a further embodiment of the present disclosure.

Please refer to FIG. 7, which is a schematic diagram illustrating the interior of a handheld apparatus with touch input function according to a further embodiment of the present disclosure. Compared with the handheld apparatus of FIGS. 3A-3G, the touch-sensitive module 72 is integrated with the display module (e.g. formed on the surface of the display module or in the display module).

The touch-sensitive module 72 includes the display touch sensor set 721 and the edge touch sensor sets 722, and the later are close to or immediately adjacent to the sidewalls 12S. The display module 23 is attached to the lower surface of the transparent cover 21 by the optically clear adhesive 24. In this diagram, the edge touch sensor sets 722 are disposed at two sides of the casing 12, and the edges of the edge touch sensor sets 722 are as close to the sidewalls 12S of the casing 12 as possible so that the edge touch sensor sets 722 can sense the edge touch actions and the lateral touch actions. The other circuit components 25 are disposed on the circuit board 26 located under the display module 23. The circuit board 26 is electrically connected to the display module 23 and the touch-sensitive module 72 through the flexible printed circuit board 27 or any known communication means. The control circuit chip 4 is disposed on one flexible printed circuit board 27.

Figure 8:
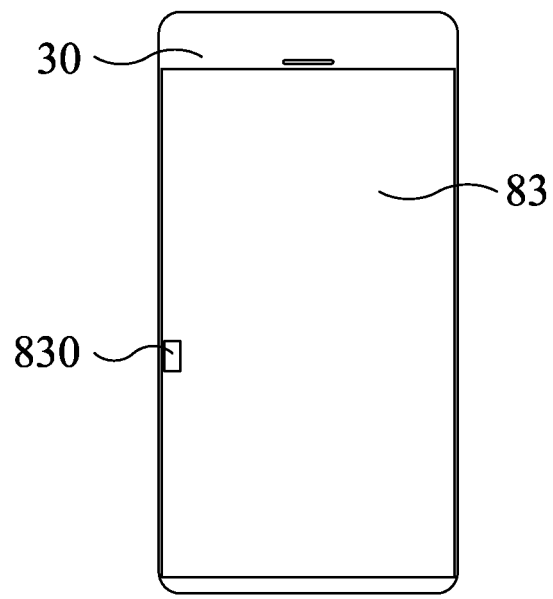
FIG. 8 is a top view of a handheld apparatus with touch input function according to a further embodiment of the present disclosure.

For a narrow-frame smartphone or a full screen display smartphone as shown in FIG. 8, the width of the visible region 83 of the display module is almost or approximately equal to the width of the main body 30 of the smartphone, or the visible region 83 may even partially or entirely covers the lateral surfaces of the main body 30. Therefore, the edge 830 of the visible region 83 should also support touch input. In other words, when a finger touches the edge 830 of the visible region 83 or the lateral surface of the smartphone, the touch-sensitive module (see FIG. 9) should be able to sense the positions of the contact points. The detail is given in the following embodiments.

Figure 9:
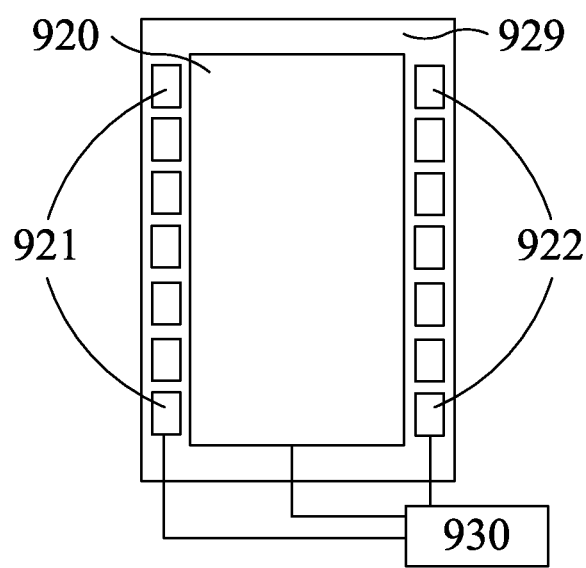
FIG. 9 is a top view illustrating the arrangement of touch sensor sets of the touch-sensitive module of the handheld apparatus.

Please refer to FIG. 9, which is a top view illustrating the arrangement of touch sensor sets of the touch-sensitive module of the handheld apparatus. The touch sensor sets are mounted on the surface 929 of the touch-sensitive module include a first touch sensor set 920 and a second touch sensor set (921 and/or 922). The first touch sensor set 920 (respective sensor pads are not shown) is provided for mainly sensing the touch action or user gesture above the first touch sensor set 920. The second touch sensor set is close to the sidewalls, and includes separate sensor pads, which are independent of each other, arranged in at least one column. Each sensor pad is electrically connected to a control circuit chip 930 through a respective trace in one-to-one manner (only two traces are shown in FIG. 9). The second touch sensor set includes at least one edge touch sensor set, e.g. a first edge touch sensor set 921 and a second edge touch sensor set 922 in this diagram. The edge touch sensor sets 921 and 922 are close to or immediately adjacent to the sidewalls 12S of the casing 12 (see FIGS. 6 and 7). Besides smartphone, the handheld apparatus of the present disclosure may be a touch control apparatus, without a display module, which has a top touch surface and a lateral touch surface for receiving touch input, e.g. multimedia remote controller, gamepad or controller with human machine interface (HMI).

The control circuit chip 930 may be disposed in an accommodation space 31 (see FIGS. 6 and 7) defined by the transparent cover 21 and the casing 12 including the sidewalls 12S. The touch sensor sets 920, 921 and 922 are electrically connected to the control circuit chip 930 through traces. Only one trace is shown between one sensor pad of each of the edge sensor sets 921 and 922 and the control circuit chip 930 for illustration purposes, and the other traces are omitted. The control circuit chip 930 controls the second touch sensor set to sense the touch actions in a first mode and a second mode.

In the first mode, the capacitance change of at least one sensor pad of the second touch sensor set (921 and/or 922) resulting from an object (e.g. finger) moving near or touching the sidewall is measured. At this time, the first touch sensor set 920 operates normally for sensing the touch actions on the display module. Thus, in the first mode, at least one sensor pad of the second touch sensor set (921 and/or 922) can independently sense the finger in the proximity of or in contact with the sidewall according to the capacitance change. Therefore, the sidewalls of the casing also support touch input. Please refer to FIGS. 3-7 and related description for the operation principle in the first mode. The visible region 83 of the display module 23 is substantially as wide as the casing 12 and the display module 23 overlaps the touch sensor sets (touch-sensitive module). In another embodiment, the touch sensor sets are integrated into the display module 23 to form an in-cell touch display, and the details are not given here.

In the first mode, the enablement of the first touch sensor set 920 may be synchronous with the display module. In particular, when the display module is switched off, the control circuit chip 930 controls the first touch sensor set 920 to enter a standby state (lowering the scan rate or stopping scanning) until the display module is switched on again. In response to the ON state of the display module, the first touch sensor set 920 returns to normal operation to sense the touch actions above the display module.

In the second mode, the control circuit chip 930 controls a specific number or a column of the sensor pads of the second touch sensor sets (921 and/or 922) to be connected in parallel to form an long sensor pad equivalent to a strip of sensor electrode rather than independent and separate sensor pads. The connected touch sensor pads may be viewed as a strip of sensor electrode (extending along x-axis or y-axis) provided beside the first touch sensor set 920. Thus, the strip of sensor electrode can cooperate with the first touch sensor set 920 to sense the finger in proximity to or in contact with the transparent cover according to the capacitance change thereof. When the control circuit chip 930 is switched to the second mode, the second touch sensor sets (trips of sensor electrodes) 921, 922 cooperate with the first touch sensor set 920 to sense the finger in proximity to or in contact with the transparent cover according to the capacitance change thereof. Therefore, the whole top surface including the edges can support touch input so as to enlarge the touch area to fit the entire graphic user interface. Such design is especially applicable to a narrow-frame smartphone or a full screen display smartphone. If a smartphone case is used, the smartphone case protects the lateral surfaces of the smartphone from being touched. It is inconvenient for pressing the lateral buttons, or holes should be provided on the smartphone case for exposing the lateral buttons. The present disclosure provides a better solution. The edge touch sensor pads (refer to FIGS. 3G 3H and 3F) at the edges of the visible region of the display module can sense the lateral touch actions without actually touching or pressing the lateral surfaces. Hence, use of the smartphone case does not affect the sensing function on the lateral surfaces. The lateral real buttons can be eliminated to enhance the waterproof effect of the smartphone.

Figure 10:
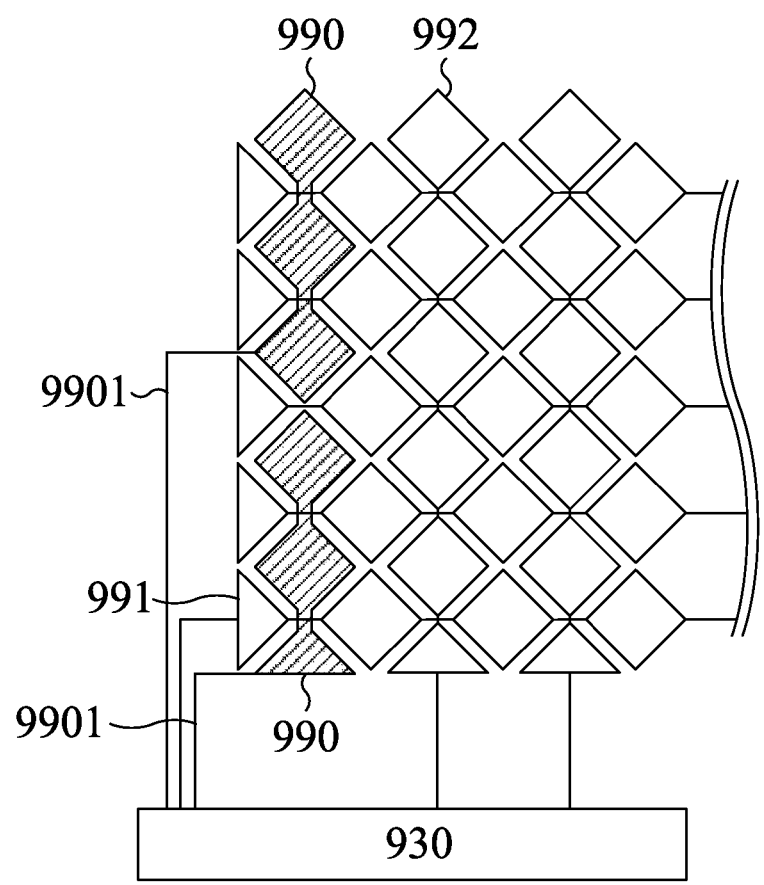
FIG. 10 is a top view illustrating the sensor pads operating in the second mode.

Please refer to FIG. 10, is a top view illustrating the sensor pads operating in the second mode. The sensor pads 990 in FIG. 10 are similar to the separate sensor pads of the first edge touch sensor set 921 or the second edge touch sensor set 922 in FIG. 9. Each sensor pad 990 is electrically connected to the control circuit chip 930 through a respective trace 9901 in one-to-one manner. The first sensor pads 991 arranged in rows and the second sensor pads 992 arranged in columns constitute the first touch sensor set 920 (FIG. 9). In the second mode, the control circuit chip 930 controls the first sensor pads 991 and the second sensor pads 992 to sense the touch actions thereon. Meanwhile, the control circuit chip 930 controls the separate sensor pads 990 to be connected in parallel so that the connected sensor pads 990 are equivalent to the second sensor pads 992 arranged in one column. Thus, in addition to the touch surface corresponding to the first touch sensor set 920, the sensor pads 990 provides an additional touch surface at the edge of the smartphone. A dual function of full-screen touch input (top touch input) and edge touch input can be achieved by taking advantageous of similar sensor pads 990, 991 and 992.

The first mode and the second mode may be switched in a time-sharing manner. The control circuit chip 930 controls the sensor pads 990 in the first mode during a first time period and in the second mode during a second time period alternately to achieve dual function of full-screen touch input and edge touch input. The details about the edge touch input have described with reference to FIGS. 3-7, and repetitious description is not given here.

In another embodiment, when the display module is switched off, the control circuit chip 930 enters a default mode, i.e. the first mode, to mainly sense edge touch actions and disable the first touch sensor set 920 (conventional two-dimensional structure of electrodes along x-axis and y-axis). Thus, the phone-holding gesture will not be sensed by the first touch sensor set 920 to cause incorrect response. Besides, when the display module is switched off, the control circuit chip 930 may determine whether to enter the second mode (full-screen touch mode) or an alternate mode (between the first mode and the second mode) according to the current phone-holding gesture. For example, the edge touch function of the first mode can sense the phone-holding gesture (e.g. FIG. 1). When a specific phone-holding gesture continues for a predetermined time period, the control circuit chip 930 may decide to enter the second mode (full-screen touch mode) and then the display module is switched on. The control circuit chip 930 may refer to the orientation information of the smartphone provided by an accelerometer to make the decision.

To prevent the phone-holding gesture from affecting the touch input function, the information related to the phone-holding gesture sensed in the first mode may be introduced to the second mode (full-screen touch mode). The information may include the positions of the contact points. Thus, the contact points related to the phone-holding gesture in the sensing result are neglected in the second mode to eliminate the influence of the phone-holding gesture. Such application can enhance the precision in sensing the touch actions on the display module.

In another embodiment, when the display is switched on, the control circuit chip 930 can operate in the first mode and the second mode alternately in a time-sharing manner. If no edge touch action is sensed, the time-sharing ratio of the first mode can be gradually decreases, even to zero.

The present disclosure can provide a learning mode. For example, the smartphone may ask the user to use various phone-holding gestures and collects related information. The information corresponding to various phone-holding gestures include the positions of the contact points are stored in a database (not shown). The database can provide the information to the smartphone for specific mode to optimize the sensing function of the touch actions. If the current sensed phone-holding gesture does not match any data stored in the database, the smartphone may determine that the user is an illegal user and lock the system to prevent from unauthorized access to the smartphone, or the learning mode is activated to record the information related to the new phone-holding gesture.

Figure 11A:
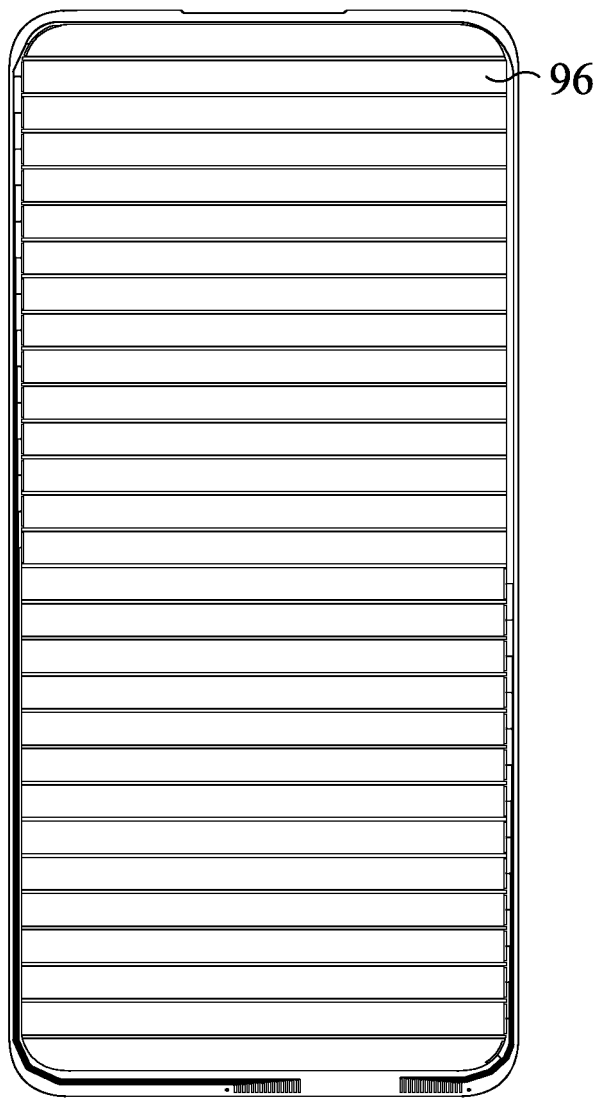
FIGS. 11A-11C are top views illustrating sensor electrodes of a handheld apparatus according to a further embodiment of the present disclosure.
Figure 11B:
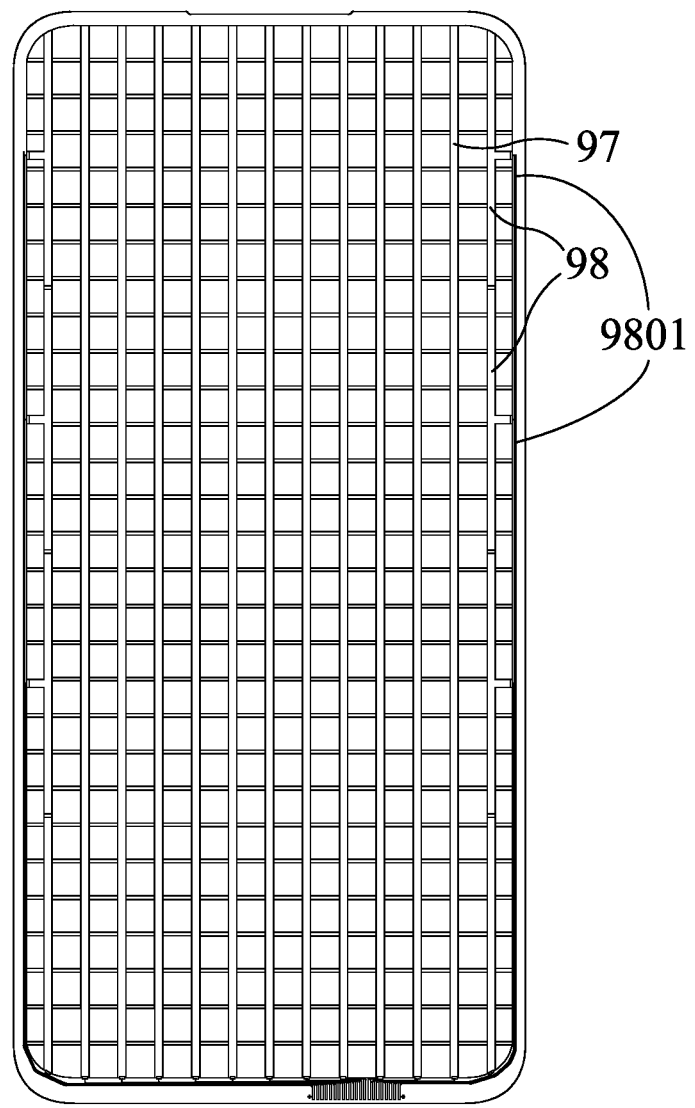
Figure 11C:
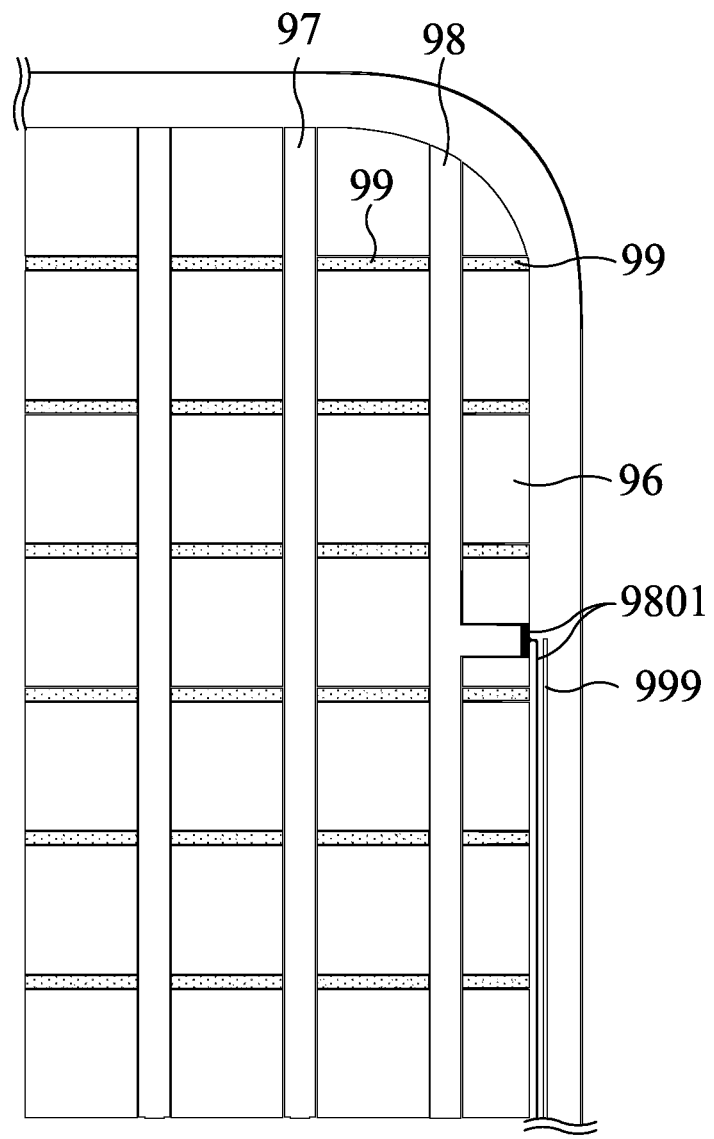

Please refer to FIGS. 11A-11C, which are top views illustrating sensor electrodes of a handheld apparatus according to a further embodiment of the present disclosure. FIG. 11A shows parallel emitting electrodes 96 of the first touch sensor set wherein the emitting electrodes 96 extend widthwise. In this embodiment, the gap between any two adjacent emitting electrodes 96 is very small. The closely arranged emitting electrodes 96 can shield receiving electrodes from electromagnetic interference (EMI) generated by circuits under the touch-sensitive module.

FIG. 11B further shows parallel receiving electrodes 97 of the first touch sensor set and separate sensor electrodes 98 wherein the receiving electrodes 97 extend lengthwise. Each sensor electrode (pad) 98 is electrically connected to the control circuit chip (not shown) through a respective signal line (trace) 9801 in one-to-one manner. More sensor electrodes 98 results in higher sensing resolution, but the control circuit chip can not support too much signal lines. Therefore, the quantity of the sensor electrodes 98 depends on the balance between the resolution and lead number of the control circuit chip. In this embodiment, there are four separate sensor electrodes 98 in the left column (or the right column) wherein each sensor electrode 98 extends lengthwise across about six emitting electrodes 96. FIG. 11C is a drawing of partial enlargement of FIG. 11B. Floating dummy electrodes 99 are filled in the gap between the emitting electrodes 96 to make the light property of this layer homogeneous to decrease visual disturbance. The lateral electrode 999 is parallel to the signal lines 9801. If the lateral electrode 999 is grounded, the lateral electrode 999 can serve as an electrostatic discharge (ESD) protection electrode. If the lateral electrode 999 is electrically connected to the control circuit chip 930, the lateral electrode 999 can serve as a signal transmitting line or a signal receiving line in dual-line sensing. The dual-line sensing technology has been described in U.S. Pat. No. 9,430,103, and contents of which are incorporated herein for reference.

In conclusion, in the handheld apparatus using the touch input method according to the present disclosure, the control circuit chip can selectively drive the first touch sensor set and the second touch sensor set to perform capacitive sensing over the whole touch surface. The structure of the handheld apparatus is simplified to decrease the complexity of production. By means of the virtual lateral button, the press action allows the finger to be closer to the sensor pad to result in greater coupling capacitance which can be adequately sensed to effectively detect the press action. If a floating ground electrode corresponding to the virtual lateral button is provided, the finger combined with the floating ground electrode can provide greater coupling capacitance to achieve better capacitive sensing effect. Furthermore, the edge touch sensor set disposed at the edge of the visible region of the display module can support the touch input on the lateral surface of the handheld apparatus, and the lateral touch actions can be well sensed without being affected by the smartphone case. Hence, the lateral real buttons can be eliminated to enhance the waterproof effect of the handheld apparatus. The handheld apparatus using the touch input method according to the present disclosure can sense edge touch actions and lateral touch actions without introducing additional proximity sensor and driving circuit which are independent of the sensor pads for normal display touch. The concept of the edge touch sensor set can be applied to the longer sides and/or the shorter sides of the handheld apparatus. The present disclosure simplifies the structure of the handheld apparatus so as to reduce the production difficulty and cost.

The components in the above-described embodiments are named based on the logical operation, and can be implemented by other equivalent components. The components may be dedicated components for specific logical operations, combined together or integrated into another system. The real applications may include some of the features described in the disclosed embodiments. The communication between components may be direct coupling or indirect coupling through a connector, a unit or a device.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A handheld apparatus with touch input function, comprising:
   a casing comprising a sidewall;
   a cover connected to the sidewall, an accommodation space being defined by the cover and the casing;
   a control circuit chip disposed in the accommodation space and operating in a first mode and a second mode; and
   a touch-sensitive module disposed in the accommodation space and electrically connected to the control circuit chip, the touch-sensitive module comprising:
   a first touch sensor set; and
   a second touch sensor set close to the sidewall, the second touch sensor set comprising a plurality of separate sensor pads arranged in a column, each separate sensor pad being connected to the control circuit chip through a respective trace, wherein, in the first mode, at least one of the separate sensor pads senses a first capacitance change thereof in response to an object in proximity of or in contact with the sidewall, wherein, in the second mode, the control circuit chip controls the separate sensor pads to be connected in parallel to form at least one sensor electrode, and the at least one sensor electrode cooperates with the first touch sensor set to sense a second capacitance change thereof in response to the object in proximity of or in contact with the cover.

2. The handheld apparatus according to claim 1, further comprising a display module disposed in the accommodation space, wherein a visible region of the display module is substantially as wide as the casing, the touch-sensitive module overlaps the display module or is integrated into the display module, and the cover is a transparent cover.

3. The handheld apparatus according to claim 2, wherein the handheld apparatus is a smartphone, and the second touch sensor set is disposed at an edge of the visible region of the display module.

4. The handheld apparatus according to claim 1, wherein the second touch sensor set comprises a first edge touch sensor set and a second edge touch sensor set at two opposite sides of the handheld apparatus, respectively, and each edge touch sensor set is close to a respective sidewall, wherein each edge touch sensor set comprises a portion of the separate sensor pads arranged in a plane and close to the respective sidewall.

5. The handheld apparatus according to claim 2, wherein when the display module is switched off, the control circuit chip in the first mode controls the first touch sensor set to enter a standby state; and when the display module is switched on, the first touch sensor set returns from the standby state to sense a touch action above the display module.

6. The handheld apparatus according to claim 1, wherein the control circuit chip in the second mode controls the separate sensor pads to be connected in parallel to form at least one equivalent sensor electrode which cooperates with the first touch sensor set to sense the second capacitance change thereof in response to the object in proximity of or in contact with the cover.

7. The handheld apparatus according to claim 6, wherein the first touch sensor set comprises a plurality of first sensor pads and a plurality of second sensor pads arranged along a first direction and a second direction, respectively, the at least one equivalent sensor electrode cooperating with the second sensor pads arranged along the second direction to provide an additional touch surface extending to an edge of the handheld apparatus.

8. The handheld apparatus according to claim 1, wherein the control circuit chip switches between the first mode and the second mode in a time-sharing manner to operate in the first mode and the second mode alternately, wherein if no edge touch action is sensed in the first mode, a time-sharing ratio of the first mode gradually decreases.

9. The handheld apparatus according to claim 2, wherein when the display module is switched off, the control circuit chip enters a default mode to sense an edge touch action first and disable the first touch sensor set.

10. The handheld apparatus according to claim 9, wherein when the display module is switched off, the control circuit chip decides whether to enter the second mode according to a current phone-holding gesture, contact points corresponding to the current phone-holding gesture sensed in the first mode being neglected while sensing the object in the second mode.

11. The handheld apparatus according to claim 1, wherein in a learning mode, information of positions of contact points related to different phone-holding gestures are collected and stored in a database, wherein when a current phone-holding gesture does not match any information stored in the database, the handheld apparatus is locked or enters the learning mode to collect information of positions of contact points related to the current phone-holding gesture.

12. The handheld apparatus according to claim 1, further comprising:
a virtual lateral button on the sidewall, the virtual lateral button deforming or shifting toward the touch-sensitive module in response to a press action; and
a ground electrode disposed inside or on an inner surface of the virtual lateral button.

13. The handheld apparatus according to claim 1, wherein if a contact area of contact points sensed by the second touch sensor set increases, it indicates that the handheld apparatus is held relatively tightly, the contact points being located on a lateral surface of the handheld apparatus or at an edge of the cover near the sidewall.

14. A touch input method used with a handheld apparatus comprising a display module, an edge touch input module and a display touch input module, the touch input method comprising steps of:
sensing a phone-holding gesture by the edge touch input module; and
deciding whether to enable the display touch input module according to the phone-holding gesture.

15. The touch input method according to claim 14, further comprising a step of entering a default mode to enable the edge touch input module and disable the display touch input module when the display module is switched off.

16. The touch input method according to claim 14, further comprising steps of:
entering a learning mode to collect and store information of positions of contact points related to different phone-holding gestures in a database; and
when a current phone-holding gesture does not match any information stored in the database, locking the handheld apparatus or entering the learning mode to collect information of positions of contact points related to the current phone-holding gesture.

17. A touch input method used with a handheld apparatus comprising a display module, an edge touch input module and a display touch input module, the touch input method comprising steps of:
enabling the edge touch input module in a first mode to sense a phone-holding gesture to generate information of positions of contact points; and
enabling the display touch input module in a second mode to sense a touch action and neglecting the contact points sensed in the first mode while sensing the touch action.

18. A handheld apparatus with touch input function, comprising:
a casing comprising a sidewall;
a transparent cover connected to the sidewall, an accommodation space being defined by the transparent cover and the casing;

a touch-sensitive module disposed in the accommodation space comprising a display touch sensor set and an edge touch sensor set, the edge touch sensor set being close to the sidewall; and a display module disposed in the accommodation space and overlapping the display touch sensor set.

19. The handheld apparatus according to claim 18, wherein the transparent cover is a glass cover, the touch-sensitive module is attached to the transparent cover by an optically clear adhesive, and the edge touch sensor set extends beyond a visible region of the display module to cover a lateral surface of the casing.

20. The handheld apparatus according to claim 18, wherein the edge touch sensor set comprises a first edge touch sensor set and a second edge touch sensor set close to respective sidewalls of the casing, each edge touch sensor set comprising a plurality of separate sensor pads arranged in a column and close to the respective sidewall, each separate sensor pad being electrically connected to a control circuit chip through a respective trace.

21. The handheld apparatus according to claim 18, wherein the touch-sensitive module is disposed on a lower surface of the transparent cover facing toward the accommodation space or disposed in the display module.

22. The handheld apparatus according to claim 18, wherein the transparent cover has a rounded edge; or the transparent cover is bent to has a curved edge connected to the sidewall wherein the edge touch sensor set attached to the transparent cover is conformal to the curved edge.

23. The handheld apparatus according to claim 18, further comprising:
a virtual lateral button on the sidewall, the virtual lateral button deforming or shifting toward the touch-sensitive module in response to a press action; and
a ground electrode disposed inside or on an inner surface of the virtual lateral button.

24. The handheld apparatus according to claim 18, wherein when the edge touch sensor set senses predetermined contact point distribution and determines that a camera mode or a selfie mode is required, the handheld apparatus automatically executes an application program of a camera to wait for confirmation or show a related user interface, a shutter button being defined on the sidewall corresponding to the a position of a thumb or index finger of the user.

25. The handheld apparatus according to claim 18, wherein if a contact area of contact points sensed by the second touch sensor set increases, it indicates that the handheld apparatus is held relatively tightly, the contact points being located on a lateral surface of the handheld apparatus or at an edge of the transparent cover near the sidewall.

* * * * *